3,146,988
SEAT RING FOR BALL VALVES
Earl F. Riopelle and Theodore B. Booss, Cincinnati, Ohio, assignors, by mesne assignments, to The Lunkenheimer Company, Cincinnati, Ohio, a corporation of Delaware
Filed Sept. 8, 1961, Ser. No. 136,759
11 Claims. (Cl. 251—315)

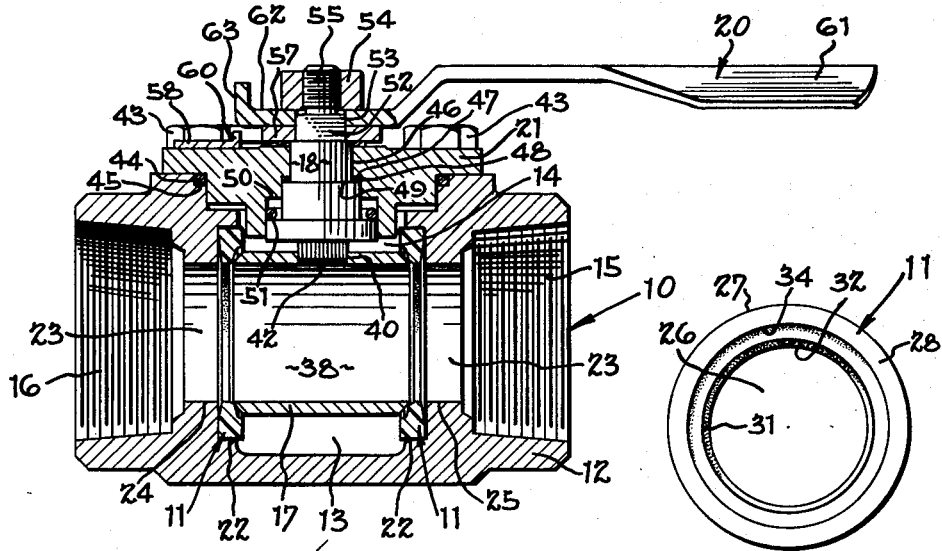
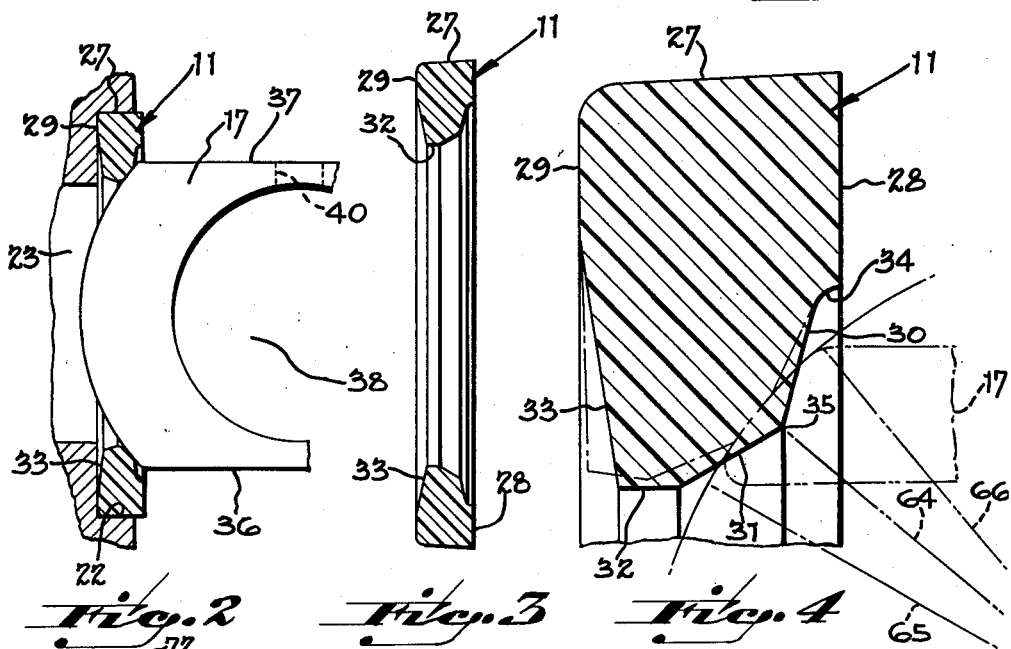
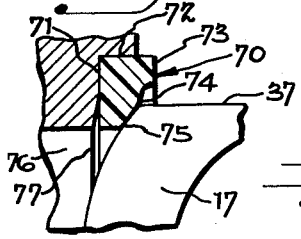

The present invention relates to ball valves and is particularly directed to a novel seat ring advantageous for use in valves of the type employing a rotatable ball, or spherical plug, as a closure member for controlling fluid flow between the inlet and outlet passageways of the valve.

The present valve seat has unique advantages when used in a ball valve of the type embodying a flattened ball as disclosed in the pending application of Edmund P. Lunken for "Ball Valve," Serial No. 47,542, now Patent No. 3,047,007. Accordingly, in order to provide a complete understanding of the manner of functioning and the advantages of the present seat, it will be disclosed in relation to certain details of construction of a flattened ball-type valve.

More particularly, a ball valve of the type with which the present seats can most advantageously be utilized comprises a valve body having conventional inlet and outlet ports disposed on opposite sides of a central valve chamber. This valve chamber is accessible through a top opening in the valve body. The valve chamber houses a ball closure member which is generally spherical except for the top and bottom portions which are constituted by flat parallel planes. The closure member includes a diametral bore for providing a fluid passageway through the valve. A stem interconnects the upper portion of the ball with a handle effective to rotate the ball to an open position in which the bore extends longitudinally of the inlet and outlet passageways to provide for flow through the valve and to a closed position in which the bore extends transversely of the valve and the solid side wall portions of the ball block fluid flow.

The ball is supported by two seats disposed in annular recesses formed in the valve body at opposite ends of the center chamber surrounding the fluid passageways. These seats not only perform the function of rotatably supporting the ball, but additionally, provide a fluid-tight seal between the ball and valve body. In order that the valve may provide an effective seal at low line pressures, the seats are preloaded, i.e. an initial sealing pressure is established between the seats and ball independent of any fluid pressure in the lines.

One of the practical difficulties with prior valve designs has been the difficulty of inserting and preloading the seats. Some valves have been provided with means for loading seats through the end of the valve and then applying an axial pressure upon the seats during the assembly process. This type of construction has the obvious disadvantage of requiring that the valve be removed from the line every time the seats are to be replaced. Another proposal has been to insert the seats and ball through a top opening in the valve while applying pressure to the seats by means of a downwardly adjustable bonnet member. This construction, too, is not satisfactory since frequently the seats are nicked or injured in some other manner during insertion or during the compressive step so that the seats leak in service.

In the flattened ball valve of the type shown in the pending application of Edmund P. Lunken, Serial No. 47,542, for "Ball Valve," these difficulties are overcome by utilizing rotational movement of the ball valve to apply a preloading pressure to the seats. Specifically, this is accomplished by initially disposing the seats within the recesses provided in the valve body and thereafter dropping the plug into the body with its faces parallel to the inner edges of the seats, the ball being dimensioned so that its transverse dimension is less than the seat spacing. The ball is then rotated about a vertical axis, preferably by inserting a member through the vertically disposed fluid bore of the ball until the spherical portions of the ball engage the seats. The relative dimensions of the ball and seats are such that the ball is effective to force the seats outwardly so that the seats are deflected and consequently placed under an initial load, or pressure. This pressure holds the seats firmly against the surfaces of the ball and adjacent walls of the body recesses to provide a leak-proof seal when the valve is closed. While an operative and satisfactory valve can be constructed utilizing the specific seats shown in the pending Lunken application, there is a tendency to damage the seats during the initial rotation of the ball unless the assembly is made with very great care. It will readily be appreciated that if the seats are nicked or abraded during assembly of the valve, the valve rapidly tends to develop leaks particularly at low fluid pressures.

One important object of the present invention is to provide novel valve seats which are effective to form guiding ramps for the flattened ball during the assembly operation so that the ball is automatically centered and guided during rotation so as to prevent any damage to the seats either when the ball is assembled during initial manufacturing assembly or is reassembled in the field in the course of replacing worn seats.

Another object of the present invention is to provide novel seats which are effective to provide leak-proof seals over wide line pressure ranges extending from a small fraction of a pound to several thousand pounds pressure, despite the normal manufacturing variations in the dimensions of the component valve parts and seats.

An additional and exceedingly important object of the present invention is to provide a valve seat configuration which is effective to provide a fluid-tight seal when the valve seat is made from a relatively inelastic material, such as "Teflon," Kel-F or the like, and is likewise effective to provide a seal when the seat is made of an elastomeric material, such as Buna-N rubber.

It will readily be appreciated that it is highly desirable for a manufacturer to provide two or more lines of ball valves. One line of valves must be effective to withstand severe usage in handling particularly corrosive fluids, such as benzol, phenol, toluol, and the like. Many of these chemicals would cause rapid deterioration of an elastomeric material and yet have no deleterious effect on certain plastics, such as "Teflon." On the other hand, fabricated Teflon seats are considerably more expensive than seats formed of an elastomeric material, such as Buna-N, so that for many installations handling non-corrosive materials, a valve having elastomeric seats would operate just as satisfactorily and would be considerably less expensive.

One of the principal advantages of the seats of the present invention is that seats of exactly the same configuration can be made from inelastic material, such as Teflon, or an elastic material, such as Buna-N, and both will provide highly satisfactory seals. Thus, either the manufacturer or user can take any valve and without changing the dimensions of either the valve body, ball or any other component can insert either Teflon or Buna-N seats, depending upon the needs of the particular installation.

More particularly, the present invention is predicated upon the concept of providing an annular seat having a front or ball opposing face constituted by a peripheral rim portion and outer and inner truncated conical ramp portions. The outer and inner truncated conical portions meet at a crest or inwardly facing projection providing a positive interference area for contact with the valve ball. These two inner and outer truncated conical portions also form entry and re-entry guide ramps for guiding the flatted peripheral portions of the ball valve during the initial rotation of the ball after its insertion in the valve. These guide ramps are angulated with respect to the adjacent surface of the ball at substantially the same angles, the angles being of the order of 20°. These entry and re-entry ramps are thus effective to guide the ball into position while preventing the ball from "biting" into or "gouging" the seat surface. The initial positioning of the ball relative to the seats is also facilitated by the provision of the peripheral rim which functions to center the ball when it is initially rotated.

The present invention is further predicated in part upon the empirical discovery and determination of a seat design which is effective to provide tight seals despite the existence of the usual manufacturing tolerances in the dimensions of the valve body, ball diameter, seat thickness, and the like. More particularly, we have determined that a seat with a maximum tolerance to manufacturing variations is provided when the crest is located upon the bisector of the angle between a line extending from the center of the ball to the intersection of a flattened side of the ball with the ball circumference, the ball being in its open position, and a second line extending from the center of the ball to the intersection of an extension of the edge of the waterway and the periphery of the ball.

It has further been empirically determined that an optimum position of a crest along the bisector is obtained by positioning the crest so that it is displaced longitudinally of the valve a distance of the order of .020″ when the ball is inserted.

In accordance with the present invention, a fluid-tight seal is obtained when the seat is made of a plastic material by a sealing pressure which results from a combination of a cantilever spring type deflection of the seal which causes the inner portion of the seal to be shifted axially in somewhat the manner of a belleville spring, and a localized surface deformation of the seat in the area of contact. In accordance with the present invention, the pressure on the seat is such that the deflection and deformation are proportioned to provide a large enough surface deformation so that the seat fully accommodates itself to any minute surface irregularities of the ball and yet is small enough so that the seat engages the ball along only a very narrow band of relatively high unit pressure, e.g., two thousand pounds per square inch so that a tight seal is obtained even in the absence of any appreciable line pressure.

These and other objects and advantages of the present invention will be more readily apparent from a consideration of the following detailed description of the drawings illustrating a preferred embodiment of the invention.

In the drawings:

FIGURE 1 is a vertical, longitudinal cross sectional view of a valve provided with seats constructed in accordance with the principles of the present invention.

FIGURE 2 is an enlarged cross sectional view through a seat ring showing the manner in which the seat ring cooperates with the ball.

FIGURE 3 is an enlarged cross sectional view through a seat ring.

FIGURE 4 is a greatly enlarged cross sectional view through a portion of the seat ring.

FIGURE 5 is a plan view of a seat ring looking toward the ball contact face.

FIGURE 6 is a fragmentary cross sectional view through a slightly modified form of seat ring and valve housing.

FIGURE 1 illustrates a preferred form of valve 10 provided with seat rings 11—11 constructed in accordance with the present invention. It is to be understood that the present seat rings are particularly adapted for use with a valve of the type employing a flattened ball as in valve 10; and when so used the present seats provide certain unique advantages related to the manner of assembly of the valve. At the same time it is to be understood, however, that the present seats can be used not only with a ball valve of the type shown in FIGURE 1, but also with other types of valves having unflattened balls as well.

In order to provide a full and complete understanding of the construction and manner of functioning of the present seats, they will be described in detail in relationship to the other elements of the valve shown in FIGURE 1. This valve, except for the seat configuration, is the same valve disclosed in the copending patent application of Edmund P. Lunken, Serial No. 47,542, for "Ball Valve," now Patent No. 3,047,007, which application is a divisional application of the pending patent application of Edmund P. Lunken Serial No. 803,431 for "Ball Valve," now abandoned.

As is shown in FIGURE 1, valve 10 comprises a body 12 formed of any suitable material, such as bronze, stainless steel, carbon steel, rigid plastics e.g., polyvinyl chloride, or the like. The valve body is provided with a central valve chamber 13 having a top opening 14 and a pair of opposed fluid bores 15 and 16. These bores are threaded in a conventional manner for connecting the valve to sections of threaded pipe. It is to be understood that in the present valve the direction of fluid flow through the valve is immaterial so that either bore 15 or bore 16 can function as the inlet with the opposite bore functioning as the outlet.

In addition to housing 12, valve 10 also includes a rotatable flattened spherical plug, or ball 17, an actuating stem 18 for rotating the ball, and a handle 20 for positioning the stem. The stem and handle are rotatably carried by a bonnet 21 effective to seal the top opening 14 of the valve body. In addition to these elements, valve 10 includes the two annular seating rings 11 which reside in annular recesses formed at the opposite ends of central valve chamber 13 surrounding inlet and outlet openings 15 and 16. These seating rings are deformed by ball 17 to provide fluid-tight seals on opposite sides of the ball as is explained below.

More particularly, as is best shown in FIGURES 1 and 2, valve body 12 is provided with two annular recesses 22—22, disposed at opposite ends of central valve chamber 13. These recesses are square shouldered and surrounded ports 23—23 formed in internal flanges 24 and 25, disposed intermediate the ends of valve chamber 13 and inlet and outlet ports 15 and 16. Each of the annular recesses 22 receives one of the seating rings 11—11. These seating rings are formed of a yieldable material which may be a relatively inelastic plastic such as "Teflon," or "Kel-F," or alternatively may be an elastomeric material such as a Buna-N rubber compound or the like. As is shown in FIGURE 5, the seats 11 are of circular outline configuration and have a central circular opening 26 of substantially the same diameter as the diameter of bores 23—23, the outer diameter of the seats being substantially the same as the outer diameter of annular recesses 22.

As is shown in FIGURES 1 and 2, the rotatable ball, or plug 17 which engages and is supported by the seats 11—11 is of generally spheroidal form but includes two flattened portions 36 and 37. This ball is formed of any suitable material, such as stainless steel, a bronze alloy, or the like, and is provided with a central bore, or fluid passageway 38. This bore extends through the center of the ball and is preferably of the same diameter as ports 23—23 and the central opening 26 in seats 11. Two opposite ends of the ball are flattened as at 36 and 37. These flat surfaces extend parallel to one another and are parallel to the axis of bore 38.

The cross sectional configuration of the seats as related to the shape of ball 17 is best shown in FIGURES 2 and 4. As is there shown, each of the seat rings 11 includes an outer peripheral surface 27. This surface is tapered slightly from the front face 28 of the ring toward the rear face 29 of the ring to facilitate insertion of the seat rings in recesses 22. This taper is quite small, being of the order of approximately one degree, for example. Each of the seat rings 11 further comprises an outer truncated conical ball contacting surface 30, an inner truncated conical ball contacting surface 31, a cylindrical flow passage defining wall 32 and a truncated conical back surface 33. Outer truncated ball contact surface 30 is joined to front planar surface 28 by a curved section effective to form a curved rim section 34. The juncture of ball contacting surfaces 30 and 31 occurs at an obtuse angle and forms a sealing projection or crest 35.

As is shown in FIGURE 4, we have empirically determined that crest 35 should lie along a bisector 64 of an angle between radial lines 65 and 66. Line 65 extends outwardly from the center of the ball to the theoretical juncture of the extension of the wall of bore 38 of ball 17 with the spherical peripheral surface of the ball. Line 66 similarly extends from the center of the ball to the juncture of the flat surface of the ball with the spherical surface thereof. We have further empirically determined that a highly satisfactory seal is obtained by locating crest 35 so that when the seat is in a relaxed position, the crest 35 is disposed approximately .020" inwardly along a line parallel to the axis of bores 23—23 from the surface of ball 17 when the ball is inserted in the valve. This optimum displacement of the crest is increased slightly for large size valves, i.e., valves having a 4" to 8" bore in the ball.

The relative angulation of outer ball contacting surface 30 and inner ball contacting surface 31 is such that these surfaces provide substantially equal entry and re-entry angles at the points of their contact with the surface of the ball. By way of example, in a seat for a 1¼ inch waterway inner surface 31 makes an angle of 40° with wall 32 which is in turn parallel to the axis of the waterway. Outer ball contacting surface 30 makes an angle of 70° with wall 32. Thus, the surface 31 is disposed at an angle of 14°40′ with a tangent drawn to the surface of ball 17 at the theoretical juncture of the ball and seat in its relaxed position. Surface 30 makes an angle of 21°30′ with a tangent drawn to the theoretical point of juncture of the ball and seat in its relaxed position. It will be appreciated that during assembly, the ball first engages outer ramp surface 30 causing an outward deflection of the seat before inner ramp surface 31 is engaged. Thus, in practice, the entry and re-entry angles between the ball surface 30 and 31 are even closer together than in the theoretical design.

When the ball is supported by the seats 11 in its operative position in valve body 12, flattened surface 37 comprises the top surface of the ball, while surface 36 comprises the bottom or lower surface. Top face 37 is provided with a rectangular opening 40 which extends completely through the upper surface into communication with the bore of the ball. Rectangular opening 40 is adapted to receive either a square projection 63 formed on the end of handle 20 or a square end 42 of stem 18. As is explained below, this projection 63 of the handle is inserted in opening 40 in order to provide a ready means for turning the ball during assembly of the valve. During normal operation of the valve, rectangular opening 40 loosely receives the rectangular lower end 42 of stem 18. Plug 17 is rotated in normal operation by turning handle 20 which drives the plug through the mechanical connection provided by stem 18.

When the ball 17 is rotated to its open position as shown in FIGURE 1 bore 38 of the ball is disposed coaxial with ports 23—23 to provide a straight-through passageway for fluid flow through the valve between inlet and outlet ports 15 and 16. When the ball is rotated to a closed position by rotation of stem 18, bore 38 of the ball is shifted to a direction at right angles to the axis of ports 23—23. With the ball in this position, the uninterrupted spherical side surfaces of the ball extend across the central openings 26 of seat rings 11. These seat rings and ball thus seal off the fluid passageway through the valve and present fluid flow between passages 15 and 16.

As is shown in FIGURE 1, bonnet 21 of the present valve is mounted over the top opening of the valve by means of a plurality of mounting bolts 43 which threadably engage tapped openings in the valve body. The upper portion of the valve body is provided with an annular recess 44 which receives an O-ring 45. This O-ring is compressed between the valve body and bonnet to provide a fluid-tight seal between these members. Bonnet 21 is further provided with a vertical bore 46 which rotatably journals stem 18. This bore is configurated to form a shoulder 47 against which a thrust washer 48 is compressed by a cooperating shoulder 49 formed on the valve stem. The vertical bore in the bonnet is further provided with an enlarged section 50 for receiving an O-ring 51 which provides a seal between the stem and bonnet.

The upper end of stem 18 is provided with a square projecting portion 52. This projecting portion extends upwardly above the upper end of bonnet 21 and is adapted to cooperatively engage a square opening 53 formed in handle 20. The handle and stem are held in engagement by means of a nut 54 which threadably engages the outer end 55 of valve stem 18. A movable handle stop plate 57 is mounted intermediate handle 20 and bonnet 21. Handle stop plate 57 is provided with two horizontal arms extending at right angles to one another and is further provided with a square opening at the juncture of the arms for cooperatively engaging the square upper end of stem 18.

Movable stop plate 57 is adapted to cooperatively engage a stationary stop member 58 which is bolted to the top of the bonnet. Stationary stop member 58 includes an upwardly extending lip 60 disposed between the two arms of the stop plate. Rotatable stop plate 57 and the stationary stop member 58 cooperate so that when the valve handle 20 is rotated to the open position in which the bore 38 of ball 17 is properly aligned with bores 23, one arm of the movable stop member engages lip 60. Similarly, when the valve is rotated to its closed position in which the bore 38 of the ball extends transversely of bores 23—23, the second arm of the movable stop plate engages stationary lip 60.

As is shown in FIGURES 1 and 2, handle 20 is formed of any suitable material, such as carbon steel, and includes a hand engaging portion 61 which is offset from the flat stop engaging portion 62. The tip of the handle remote from hand engaging portion 61 is upturned to form a lip or tang 63. This tang is of rectangular configuration and is of a width slightly less than the width of bore 40 formed in ball 17. Also, the width of flat portion 62 of the handle is less than the diameter of the bore 38 formed in ball 17. Consequently, as is explained below, during assembly of the valve, flat portion 62 of the handle is adapted to be inserted within bore 38 while the tang portion 63 of the handle is inserted within square opening 40 of the ball.

When assembling the valve, the two seat rings 11—11 are inserted through top opening 14 of the valve body and are placed in annular recesses 22—22 of the valve body. The planar rear faces 29 of the seats engage the rear faces of the annular recesses, while the conical rear side portions 33 of the seats are spaced slightly from the rear faces of the annular recess.

When the seats are in place ball 17 is then disposed above top opening 14 with the axis of bore 38 being vertical and parallel flat surfaces 36 and 37 of the ball extending parallel to the inner surfaces 28 of the seats. The distance between the flat surfaces 36 and 37 on ball 17 is less than the spacing between the opposing inner surfaces 28 of the seats so that the ball can be inserted freely between the seats.

The inner, or flat portion 62 of the handle member 20 is then inserted downwardly through bore 38 of the ball and the tang 63 of the handle is inserted within square opening 40 of the ball. The handle is then rotated ninety degrees about a vertical axis to bring the spherical side portions of the ball into engagement with the seats as is shown in FIGURE 2. It will be appreciated that in the present valve there is no special support surface provided for the lower portion of the ball. Consequently, when the ball is initially inserted between the seats, it is not in correct vertical alignment with the seats. However, when the ball is initially rotated about a vertical axis, the curved portions of the ball engage curved rim portions 34 of the seats which function to center the ball relative to the seats during initial rotative movement of the ball. As the ball continues to rotate it engages outer ramp surface 30 and forces the cantilevered portion of the seat outwardly toward the dotted position shown in FIGURE 4. Upon still further rotation of the ball, it engages the inner ramp surface 31. By the time the ball has been rotated 90° it fully engages crest portion 35 of the seat which crest is slightly deformed to provide a narrow band sealing contact as is shown in FIGURE 4. This centering action provided by rim 34 and ramps 30 and 31 prevents any undue abrasion or other damage to the seats during assembly of the valve.

As is best seen from FIGURE 4, the normal spacing between interfering portions 35 of the two seats 11—11 is less than the full diameter of the ball. Thus, when the ball is rotated to bring its arcuate portions into engagement with the seats, a positive interference condition is created as is shown by the dotted lines in FIGURE 4. In other words, the ball forces the seats 11—11 outwardly from their relaxed position shown in solid lines to their preloaded position shown in dotted lines. If the seat is formed of a plastic material two different types of deformation occur during the preloading of the seats. In the first place, because of the truncated rear surface 33 of the seat, the entire inner portion of the seat is shifted rearwardly in the manner of a belleville spring. This spring type deflection occurs well within the elastic limits of the material. At the same time, however, the interfering portion, or crest 35, at the juncture of surfaces 30 and 31 undergoes a permanent deformation to form a band sealing area in engagement with the ball. It is to be understood that this preloading pressure exerted upon the valve seats by the ball is completely independent of any fluid pressure existing in the fluid conduits. Consequently, the valve is effective to provide a fluid-tight seal at fluid pressure or even under vacuum conditions.

If seat rings 11 are made from an elastomeric material the seat rings are deformed in generally the same manner as when the seats are formed of plastic. However, when the seats are elastomeric crest 35 undergoes a surface deformation that is elastic rather than permanent.

After the ball has been brought to a position in which the flat surfaces 36 and 37 extend parallel to the axis of bores 23—23 and the seats have been compressed to effect a preloading, handle 20 is withdrawn and the ball is rotated about a horizontal axis through bores 23—23 to bring upper surface 37 into a horizontal plane as is shown in FIGURES 1 and 2.

To complete the assembly, the stem is inserted with its lower projection in engagement with square opening 40 of the ball and the bonnet is placed over top opening 14 of the valve. The bonnet and stationary stop member are secured to the valve body by means of bolts 43. Finally, the movable stop plate 57 and valve handle are placed over the upper end of stem 18 and are secured in place as by means of nut 54. The valve is then ready to be connected to a line by joining threaded bores 15 and 16 to the ends of suitable pipes.

Once a valve has been placed in service, if it should subsequently become desirable to replace seats 11, this can readily be accomplished without the necessity of removing valve 10 from the line. More particularly, in order to replace seats 11, the bonnet and handle are initially removed by removing bolts 43. The handle is separated from the bonnet and this or another tool is utilized to rotate the ball about a horizontal axis through bores 23—23 to bring fluid passageway 38 of the ball into a vertical position. Next, the end of the handle is inserted in opening 38 of the ball with tang 63 in engagement with opening 40. The ball is then rotated ninety degrees about a vertical axis to bring the flat sides 36 and 37 of the ball into transverse position parallel to front faces 28—28 of the seats. The ball can then readily be lifted from the valve and the seats removed from their annular recesses. New seats are then inserted through the top opening of the valve and the valve is then reassembled in the manner described above. Since, as was explained above, a positive interference condition exists between the valve and seats once the ball 17 has been rotated to bring its spherical surface into contact with the seats, a predetermined preloading pressure is automatically obtained without the need for the workman to make any adjustments.

When the valve is in service, the valve is opened by positioning the handle to rotate ball 17 so as to bring bore 38 into alignment with inlet and outlet ports 23 and 23 of the valve body. In this position, the plug provides an unobstructed flow of fluid through the ports 15 and 16 of the valve. To close the valve, handle 20 is rotated ninety degrees until further movement is arrested by the cooperation of the movable stationary stop members. When the handle is so positioned, plug 17 is rotated to bring bore 38 to a position as shown in FIGURE 2 in which the bore extends transversely of the valve and the center aperture 26 in both seating rings 11—11 is completely closed by the solid side spherical surfaces of the ball. The ball is supported at all times solely by the seat rings and more particularly by the very narrow band at crest 35. Because of this narrow band contact, a relatively high sealing pressure is obtained which results in a fluid-tight seal even when there is practically no fluid pressure in the line. A typical valve of the present construction is effective to provide a completely fluid-tight seal from zero line pressure or even a vacuum condition up to a line pressure of well over four hundred pounds per square inch.

From the above disclosure of the general principles of the present invention and the above detailed description of a preferred embodiment, those skilled in the art will readily comprehend various modifications to which the invention is susceptible.

One such modification is shown in FIGURE 6. As there shown, a modified seat 70 is shown in position within a modified form of annular recess 71 provided in the valve body. In the specific seat shown in FIGURE 6, the ball contacting surfaces of the valve are the same as the corresponding surfaces of the valve shown in the preferred embodiment.

Specifically, ring 70 includes an outer peripheral surface 72, an outer rim portion 73, and outer and inner truncated conical ball contacting surfaces 74 and 75. These truncated conical ball contacting surfaces meet in a crest corresponding to crest 35. Seat 70 also is provided with a central circular opening of substantially the same diameter as the diameter of the adjacent bore 76 in the valve housing.

The principal difference between the seat 70 of FIGURE 6 and seat 11 of FIGURE 4 is that in seat 70 the rear, or back, surface of the seat is not a truncated conical surface, but rather is a planar surface extending at right angles to the axis of the waterway. In the embodiment shown in FIGURE 6, clearance is provided for outward movement of seat 70 by providing a relieved or bevelled portion 77 on the surface of the annular recess in the valve body.

In use, the modified form of seat 70 is inserted in the same manner as seats 11. Seat 70 deflects when a ball is inserted in the valve, and cooperates with the ball to provide a fluid-tight seal in the same manner as seat 11.

Having described our invention, we claim:

1. In a valve comprising a valve body having a valve chamber accessible from the top of said body and inlet and outlet ports disposed at opposite sides of the valve chamber, said body having an annular recess surrounding each of said fluid ports, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball.

2. In a valve comprising a valve body having a valve chamber accessible from the top of said body and inlet and outlet ports disposed at opposite sides of the valve chamber, said body having an annular recess surrounding each of said fluid ports, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball, the outer surface of said seat ring being tapered inwardly from the periphery of said seat ring, whereby said outer surface of said ring is spaced from said valve body.

3. In a valve comprising a valve body having a valve chamber accessible from the top of said body and inlet and outlet ports disposed at opposite sides of the valve chamber, said body having an annular recess surrounding each of said fluid ports, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball, and a peripheral rim disposed outwardly of said truncated conical surfaces and extending inwardly toward said ball.

4. In a valve comprising a valve body having a valve chamber accessible from the top of said body and inlet and outlet ports disposed at opposite sides of the valve chamber, said body having an annular recess surrounding each of said fluid ports, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball, the said conical surfaces engaging said ball at substantially equal angles.

5. In a valve comprising a valve body having a valve chamber accessible from the top of said body and inlet and outlet ports disposed at opposite sides of the valve chamber, said body having an annular recess surrounding each of said fluid ports, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball, the said conical surfaces engaging said ball at substantially equal angles of the order of 20°.

6. In a valve comprising a valve body having a valve chamber accessible from the top of said body and inlet and outlet ports disposed at opposite sides of the valve chamber, said body having an annular recess surrounding each of said fluid ports, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball, said crest being disposed along the bisector of an angle formed by a first line from the center of the ball to the intersection of an extrusion of the bore of said ball with the periphery of said ball, and a second line between the center of said ball and the intersection of a planar surface of said ball with the periphery thereof.

7. In a valve comprising a valve body having a valve chamber accessible from the top of said body and inlet and outlet ports disposed at opposite sides of the valve chamber, said body having an annular recess surrounding each of said fluid ports, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball, said crest being disposed along the bisector of an angle formed by a first line from the center of the ball to the intersection of an extrusion of the bore of said ball with the periphery of said ball, and a second line between the center of said ball and the intersection of a planar surface of said ball with the periphery thereof, said crest being located a distance of the order of .020" from the periphery of said ball as measured along a line parallel to the axis through said inlet and outlet ports.

8. In a valve comprising a valve body having a valve chamber accessible from the top of said body and inlet and outlet ports disposed at opposite sides of the valve chamber, said body having an annular recess surrounding each of said fluid ports, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball, the surface of the crest of said seat ring being permanently deformed to provide a narrow band in contact with said ball, the outer surface of said seat ring being tapered inwardly from the periphery of said ring, whereby the outer surface of said ring is spaced from the surface of said body and said ring is elastically deformed outwardly.

9. In a valve comprising a valve body having a valve chamber accessible from the top of said body and inlet and outlet ports disposed at opposite sides of the valve chamber, said body having an annular recess surrounding each of said fluid ports, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball, the outer surface of said ring being tapered inwardly from the periphery of said ring, whereby the outer surface of said ring is spaced from the surface of said body and said ring is elastically deformed outwardly.

10. In a valve comprising a valve body having a valve chamber accessible from the top of said body and inlet and outlet ports disposed at opposite sides of the valve chamber, said body having an annular recess surrounding each of said fluid ports, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball, and a rear surface at least a portion of which is spaced from the adjacent wall of the annular recess.

11. A valve comprising a valve body having a valve chamber accessible from the top of said body and inlet and outlet ports disposed at opposite sides of the valve chamber, said body having an annular recess surrounding each of said fluid ports, each of said recesses having a bevelled rear wall, a rotatable ball of generally spheroid form disposed within said valve chamber, said rotatable ball having a bore formed therein for registry with said inlet and outlet ports in the open position of the valve, said rotatable ball having planar parallel top and bottom surfaces, the improvement which comprises an elastically yieldable seat ring disposed within each of said annular recesses, each of said seat rings having an inner ball engaging surface disposed within said valve chamber, said ball engaging surface comprising two truncated conical surfaces intersecting at a crest projecting inwardly toward the adjacent surface of said ball, the outer surface of said seat ring being planar and being spaced from the rear wall of said annular recess.

References Cited in the file of this patent

UNITED STATES PATENTS

| | | |
|---|---|---|
| 2,945,666 | Freeman | July 19, 1960 |
| 2,989,990 | Bass | June 27, 1961 |
| 3,038,489 | Allen | June 12, 1962 |